United States Patent
Alperin

(10) Patent No.: US 7,941,388 B2
(45) Date of Patent: May 10, 2011

(54) TELECOMMUNICATIONS-BASED SOCIAL-TRUST NETWORKS

(75) Inventor: Johnathan Alperin, Mendham, NJ (US)

(73) Assignee: Avaya Inc., Basking Ridge, NJ (US)

( * ) Notice: Subject to any disclaimer, the term of this patent is extended or adjusted under 35 U.S.C. 154(b) by 742 days.

(21) Appl. No.: 11/968,754

(22) Filed: Jan. 3, 2008

(65) Prior Publication Data

US 2009/0177604 A1 Jul. 9, 2009

(51) Int. Cl.
*G06F 17/00* (2006.01)
*G06N 5/02* (2006.01)

(52) U.S. Cl. ........................................................ 706/46

(58) Field of Classification Search .................... 706/46
See application file for complete search history.

(56) References Cited

U.S. PATENT DOCUMENTS

| | | | |
|---|---|---|---|
| 7,522,749 B2 * | 4/2009 | Zitnick et al. | 382/107 |
| 7,613,675 B2 * | 11/2009 | Hawkins et al. | 706/55 |
| 7,620,608 B2 * | 11/2009 | Jaros et al. | 706/12 |
| 7,624,085 B2 * | 11/2009 | Hawkins et al. | 706/52 |
| 2009/0089126 A1 * | 4/2009 | Odubiyi | 705/7 |

OTHER PUBLICATIONS

Development of the IT Convergence Using Power Line Communication, Jung-Sook Kim; Computer and Information Science (ICIS), 2010 IEEE/ACIS 9th International Conference on Digital Object Identifier: 10.1109/ICIS.2010.46 Publication Year: 2010 , pp. 696-701.*

Development of the intelligent dust chamber bag control system using Case-Based reasoning, Kim, Jung-Sook; Information Sciences and Interaction Sciences (ICIS), 2010 3rd International Conference on Digital Object Identifier: 10.1109/ICICIS.2010.5534766 Publication Year: 2010 , pp. 546-551.*
A User-Adaptive Self-Proclamative Multi-Agent Based Recommendation System Design for E-Learning Digital Libraries, Ponnusamy, R.; Gopal, T.V.; Cybernetics and Intelligent Systems, 2006 IEEE Conference on Digital Object Identifier: 10.1109/ICCIS.2006.252279 Publication Year: 2006 , pp. 1-7.*
Rule Restriction in Event Descriptive Unit Identify, Guo Tao; Chen Junjie; Guo Hao; Computational Aspects of Social Networks (CASoN), 2010 International Conference on Digital Object Identifier: 10.1109/CASoN.2010.80 Publication Year: 2010 , pp. 329-332.*

* cited by examiner

*Primary Examiner* — Michael Holmes
(74) *Attorney, Agent, or Firm* — DeMont & Breyer, LLC

(57) ABSTRACT

A method of facilitating the construction, maintenance, and usage of social-trust networks is disclosed. The illustrative embodiment monitors the call processing details of communication events between users of a telecommunications system as the basis for estimating whether or not a relationship exists between the users that can be exploited in a social-trust network. This is possible because the call processing details of communication events between users is an excellent indicator of the nature of the relationship between users. For example, if Alice calls Brian three times a day on average, including nights, weekends, and holidays, and Brian answers Alice's calls quickly and returns her unanswered calls quickly, then it is reasonable to infer that Alice and Brian have a relationship that is substantial enough to be used in a social-trust network.

20 Claims, 4 Drawing Sheets

TELECOMMUNICATIONS-BASED SOCIAL-TRUST NETWORKS

FIELD OF THE INVENTION

The present invention relates to telecommunications in general, and, more particularly, to social-trust networks.

BACKGROUND OF THE INVENTION

Social-trust networks such as LinkedIn® or other so-called "Friend of a Friend" (FOAF) networks provide a mechanism for an initiating user to obtain an introduction to a target user with whom they cannot readily communicate by finding one or more intermediaries to facilitate the introduction. The chain of intermediaries to the target user is known as an "introduction chain."

One advantage of a social-trust network is that it knows who "trusts" whom, and, therefore, a social-trust network is able to generate an introduction chain from the initiating user to the target user through one or more intermediaries regardless of whether the initiating user knew that such a chain was possible or even knew any of the intermediaries.

On the other hand, social-trust networks in the prior art have disadvantages. In particular, the utility of a social-trust network is only as good as the users' efforts to register their contacts. When a user of a social-trust network fails to register a contact, the social-trust network cannot use the user and the contact as part of an introduction chain. For this reason, the need exists for improvements in the design and use of social-trust networks.

SUMMARY OF THE INVENTION

The present invention facilitates the construction, maintenance, and usage of social-trust networks without some of the costs and disadvantages of techniques for doing so in the prior art. In particular, the illustrative embodiment monitors the call processing details of communication events between users of a telecommunications system as the basis for estimating whether or not a relationship exists between the users that can be exploited in a social-trust network. This is possible because the call processing details of communication events between users is an excellent indicator of the nature of the relationship between users. For example, if Alice calls Brian three times a day on average, including nights, weekends, and holidays, and Brian answers Alice's calls quickly and returns her unanswered calls quickly, then it is reasonable to infer that Alice and Brian have a relationship that is substantial enough to be used in a social-trust network. In contrast, if Chris calls David occasionally but David never answers Chris's calls nor returns Chris unanswered calls, then it is reasonable to infer that Chris and David do not have a relationship.

Because the illustrative embodiment knows who knows whom, the illustrative embodiment is able to generate an introduction chain from the initiating user to the target user through one or more intermediaries regardless of whether the initiating user knew that such a chain was possible or even knew any of the intermediaries.

Furthermore, because the illustrative embodiment comprises a telecommunications system, the illustrative embodiment not only generates the introduction chain from the initiating user to one or more intermediary users and to the target user, but the illustrative embodiment also guide and establishes the communication events that enable the users to communicate.

The illustrative embodiment comprises: generating a first influence inference based on at least one communication event between a initiating user and a intermediary user; generating a second influence inference based on at least one communication event between the intermediary user and a target user; and generating an introduction chain from the initiating user to the target user via the intermediary user based on the first influence inference and the second influence inference.

DETAILED DESCRIPTION

Figure 1:
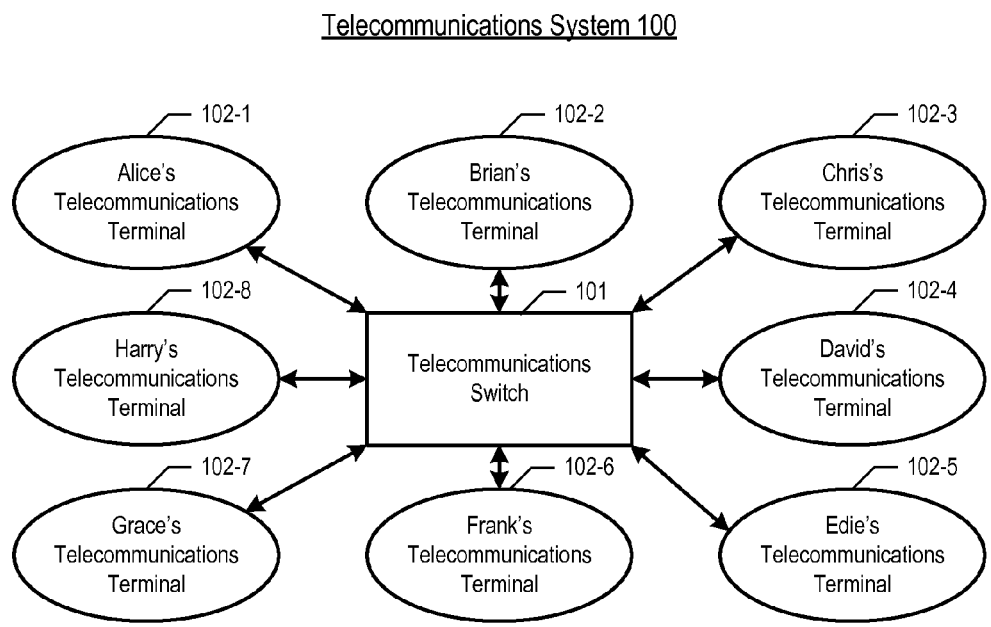
FIG. 1 depicts a schematic diagram of the salient components of telecommunications system 100 in accordance with the illustrative embodiment of the present invention.

FIG. 1 depicts a schematic diagram of the salient components of telecommunications system 100 in accordance with the illustrative embodiment of the present invention. Telecommunications system 10 comprises: telecommunications switch 101 and eight wireline telecommunications terminals 102-1 through 102-8.

Telecommunications switch 101 comprises the hardware and software for performing the functionality described below. The composition of telecommunications switch 101 is described in FIG. 2. Although the illustrative embodiment comprises only one telecommunications switch, it will be clear to those skilled in the art, after reading this disclosure, how to make and use alternative embodiments of the present invention that comprise any number of telecommunications switches in any topology.

For the purposes of this disclosure, the term "communication event" and its inflected forms is defined to include:
  i. a voice communication event, including but not limited to a telephone call or voice mail, or
  ii. a video communication event, or
  iii. a textual communication event, including but not limited to instant messaging, internet relay chat, e-mail, short-message-service, Usenet-like postings, etc., or
  iv. any combination of i, ii, and iii.

Each of telecommunications terminals 102-1 through 102-8 is well known in the art and is associated with a user— Alice, Brian, Chris, David, Edie, Frank, Grace, or Harry, respectively. Although the illustrative embodiment comprises eight wireline telecommunications terminals, it will be clear to those skilled in the art, after reading this disclosure, how to make and use alternative embodiments of the present invention that comprise any number of terminals. Furthermore, it will be clear to those skilled in the art, after reading this disclosure, how to make and use alternative embodiments of the present invention that comprise any number of wireless and wireline terminals. It will be clear to those skilled in the art how to make each of telecommunications terminals 102-1 through 102-8.

Figure 2:
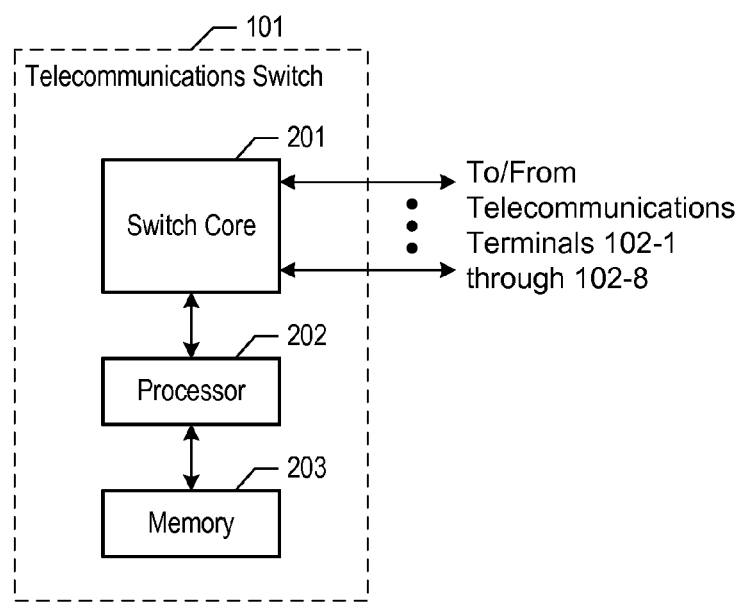
FIG. 2 depicts a block diagram of the salient components of telecommunications switch 101, which comprises: switch core 201, processor 202, and memory 203, interconnected as shown.

FIG. 2 depicts a block diagram of the salient components of telecommunications switch 101, which comprises: switch core 201, processor 202, and memory 203, interconnected as shown.

Switch core 201 is well-known in the art and comprises the hardware and software for interacting with telecommunications terminals 102-1 through 102-8 under the direction of processor 202. It will be clear to those skilled in the art how to make and use switch core 201.

Processor 202 comprises hardware and software for performing the functionality described in detail below. For example, processor 202 reads program instructions and data from memory 203 and writes data to memory 203, and processor 202 controls switch core 201, and is responsible for all call processing in telecommunications switch 101.

Memory 202 is a non-volatile memory that comprises the operating system, program instructions, and data (e.g., call-detail records, the influence inferences, etc.) used by processor 202 in the operation of telecommunications switch 101. It will be clear to those skilled in the art how to make and use memory 202.

Figure 3:
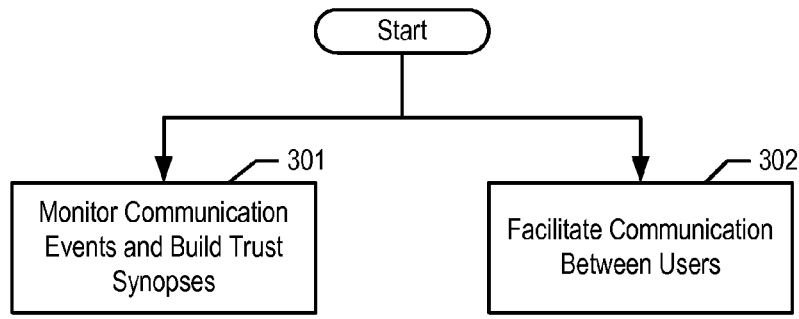
FIG. 3 depicts a flowchart of the salient tasks associated with the operation of the illustrative embodiment.

FIG. 3 depicts a flowchart of the salient tasks associated with the operation of the illustrative embodiment.

At task 301, telecommunications switch 101 continually monitors the call processing details of all of the communication events through it and generates and maintains an "influence inference" for each pair of users based on the call processing details. For the purposes of this disclosure, the term "influence inference" is defined as an estimate of the likelihood that one user—a "intermediary" user—has the influence on another user—a "target" user—to have the target user agree to communicate with a third user—a "initiating" user. When an introduction chain comprises more than one intermediary user, each subsequent intermediary user is a "target" user. The generation of the influence inferences is described in detail below.

At task 302, telecommunications switch 101 uses the influence inferences to facilitate communication between users. This is also described in detail below.

In accordance with the illustrative embodiment, tasks 301 and 302 are performed concurrently, but it will be clear to those skilled in the art, after reading this disclosure, how to make and use alternative embodiments of the present invention in which tasks 301 and 302 are not performed concurrently.

Figure 4:
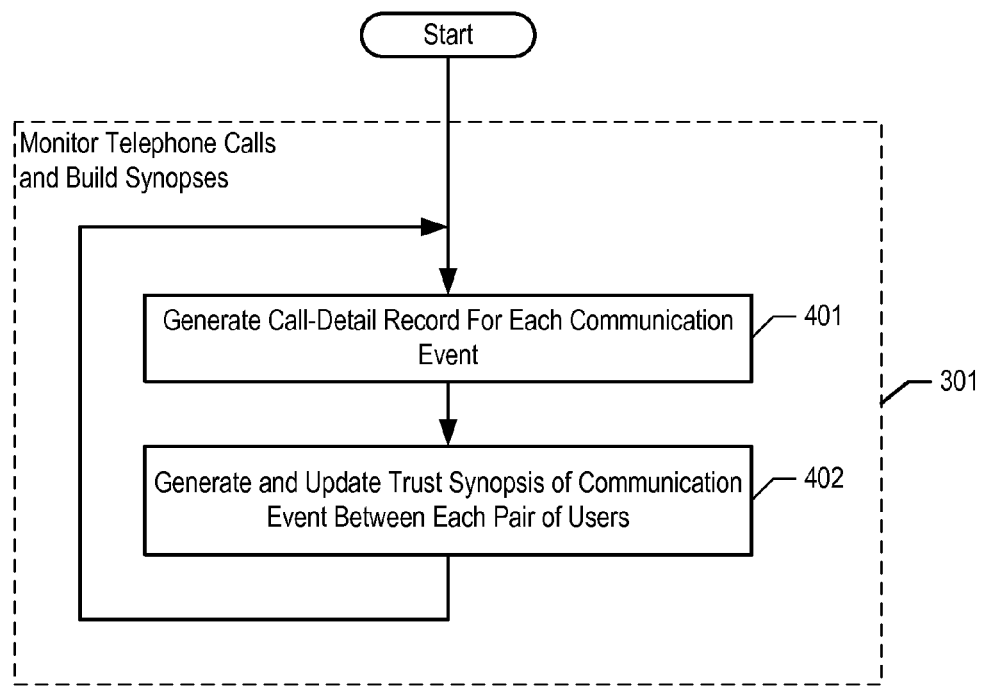
FIG. 4 depicts a flowchart of the salient tasks associated with the operation of task 401.

FIG. 4 depicts a flowchart of the salient tasks associated with the operation of task 401.

At task 401, processor 202 generates a call-detail record for each communication event through switch core 201. In accordance with the illustrative embodiment, the call-detail record for each communication event comprises:
  i. the user who initiated the communication event (as inferred by the identity of the telecommunications terminal associated with that user), and
  ii. the calendrical time that the communication event was initiated, including but not limited to the time of day, day of the week, date, holiday, etc., and
  iii. the user to whom the communication event was directed (as inferred by the identity of the telecommunications terminal associated with that user), and
  iv. whether the communication event was answered or not, and if answered the latency with which a communication event is answered after the called telecommunications terminal alerts the user of a communication event and the identity of the caller, and
  v. the length of the communication event, and
  vi. if the communication event is a return of a previously unanswered communication event (as inferred by a previous unanswered communication event).

It will be clear to those skilled in the art, after reading this disclosure, how to make and use alternative embodiments of the present invention in which the call-detail records comprise any subset of these items.

At task 402, processor 202 generates an influence inference for each pair of users based on the call-detail records generated in task 401. For example, if Alice calls Brian three times a day on average, including nights, weekends, and holidays, and Brian answers Alice's calls quickly and returns her unanswered calls quickly, then it is reasonable to infer that Alice has some influence with Brian and can be used by someone who has influence with Alice to be introduced to Brian. In contrast, if Chris calls David occasionally but David never answers Chris's calls nor returns Chris unanswered calls, then it is reasonable to infer that Chris has little or no influence with David.

In accordance with the illustrative embodiment, the influence inference for each pair of users is based on Equation 1 and data that is derived from the call-detail records generated in task 401. In accordance with the illustrative embodiment, the formula is:

$$I_{ij} = \frac{A_{ij} + B_{ij} + C_{ij}}{3} \quad \text{(Eq. 1)}$$

where $I_{ij}$ is the estimate of influence of user i over user j, $A_{ij}$ is number of calls initiated by user i to user j divided by the total number of calls between user i and user j, $B_{ij}$ is the average number of seconds taken by user j to answer calls from user i divided by 60, and $C_{ij}$ is the average number of minutes taken by user j to return unanswered calls from user i divided by 60. It will be clear to those skilled in the art, after reading this disclosure, how to make and use alternative embodiments of the present invention that use a different formula for estimating the estimate of influence of user i over user j. Furthermore, it will be clear to those skilled in the art, after reading this disclosure, how to make and use alternative embodiments of the present invention that use different data culled from the call-detail records in the formula.

Figure 5:
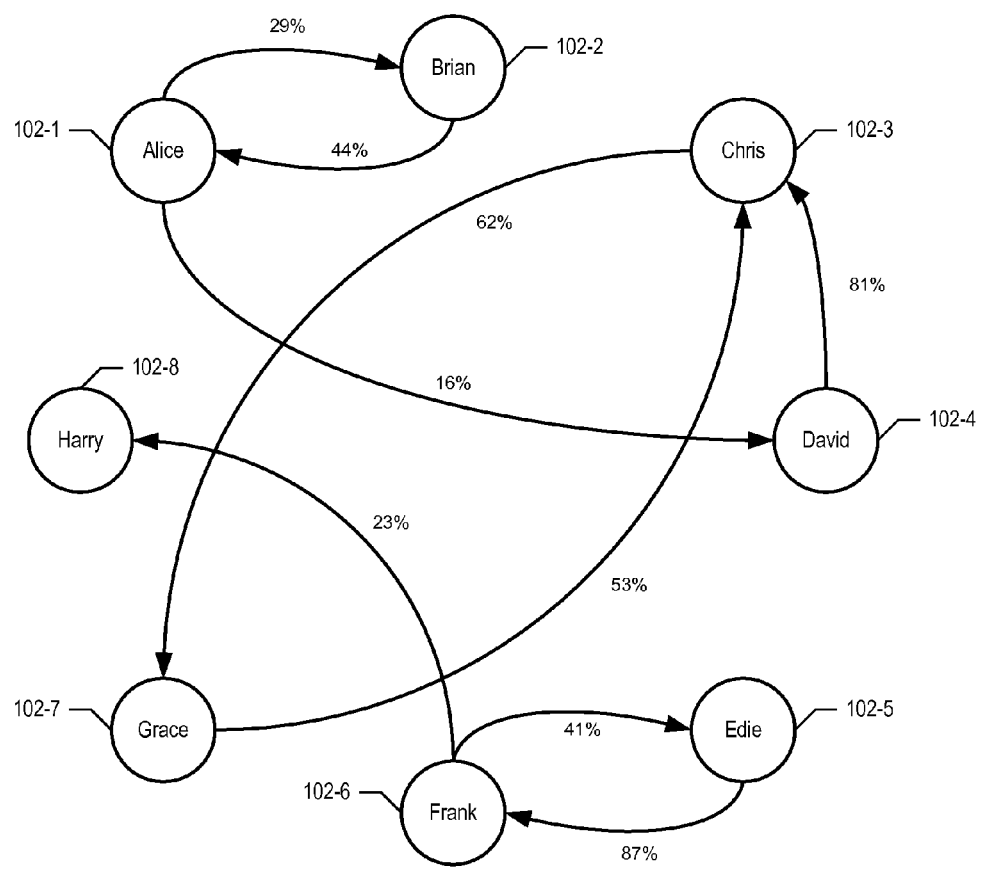
FIG. 5 depicts directed graph in which each node is a user, each edge is a non-zero influence inference, and the weight of each edge is the numerical estimate of the probability that one user will be able to influence the second user to facilitate communication with a third user.

The influence inferences for all of the users can be represented a weighted directed graph in which each node is a user, each edge is a non-zero influence inference, and the weight of each edge is the numerical estimate of the probability that one user will be able to influence the second user to facilitate communication with a third user. An illustrative graph appears in FIG. 5. In accordance with the illustrative embodiment, the graph in FIG. 5 is represented in telecommunication switch 101 by a matrix corresponding to the graph, as shown in Table 1.

TABLE 1

Illustrative Influence Inference Matrix

|      |       | To    |       |       |       |      |       |       |       |
|------|-------|-------|-------|-------|-------|------|-------|-------|-------|
|      |       | Alice | Brian | Chris | David | Edie | Frank | Grace | Harry |
| From | Alice | —     | 29%   | —     | 16%   | —    | —     | —     | —     |
|      | Brian | 44%   | —     | —     | —     | —    | —     | —     | —     |
|      | Chris | —     | —     | —     | —     | —    | —     | 62%   | —     |
|      | David | —     | —     | 81%   | —     | —    | —     | —     | —     |
|      | Edie  | —     | —     | —     | —     | —    | 87%   | —     | —     |
|      | Frank | —     | —     | —     | —     | 41%  | —     | —     | 23%   |
|      | Grace | —     | —     | 53%   | —     | —    | —     | —     | —     |
|      | Harry | —     | —     | —     | —     | —    | —     | —     | —     |

For example, according to the data in Table 1, it is estimated that Alice will have a 29% probability of being able to influence Brian to communicate with a third user.

Figure 6:
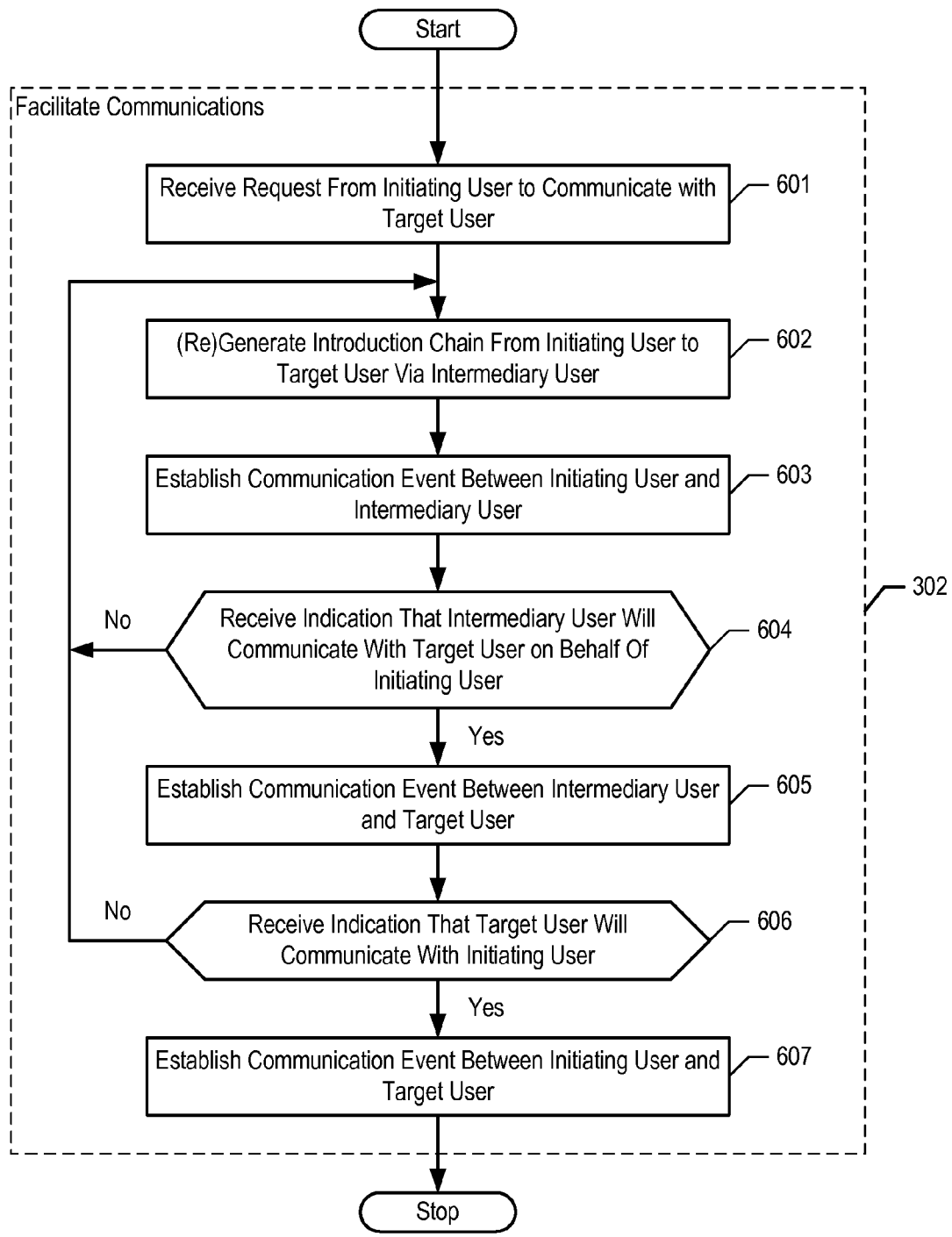
FIG. 6 depicts a flowchart of the salient tasks associated with the performance of task 302.

FIG. 6 depicts a flowchart of the salient tasks associated with the performance of task 302.

At task 601, telecommunications switch 101 receives a request from a first user—an initiating user—to communicate with a second user—the target user. The initiating user can communicate this request through his or her telecommunications terminal.

At task 602, telecommunications switch 101 generates (or regenerates) an introduction chain from the initiating user to the target user via one or more third parties or intermediary users. The introduction chain between the initiating user and the target user—if one exists—is a path through the directed graph from the initiating user to the target user. If more than one path from the initiating user to the target user exists in the graph, then the introduction chain is that path which has the greatest probability for success. When one introduction chain fails at either task 604 or 606, telecommunications switch 101 re-generates another introduction chain in an attempt to circumvent the obstacle and continues with it. It will be clear to those skilled in the art, after reading this specification, how to generate the introduction chain from the directed graph and data in Table 1.

At task 603, telecommunications switch 101 establishes a communication event between the initiating user and the intermediary user, during which the initiating user requests that the intermediary user contact the target user (or next intermediary user in the introduction chain) on behalf of the initiating user.

At task 604, telecommunications switch 101 either receives an indication that the intermediary user will in fact communicate with the target user (or next intermediary user in the introduction chain) on behalf of the initiating user or does not receive the indication. This indication can be transmitted by either the initiating user or the intermediary user. When telecommunications switch 101 does receive the indication, control passes to task 605; otherwise, control passes to task 602 where telecommunications switch 101 generates another introduction chain to circumvent to obstacle.

At task 605, telecommunications switch 101 establishes a communication event between the intermediary user and the target user (or next intermediary user in the introduction chain), during which the intermediary user requests that the target user (or next intermediary user in the introduction chain) communicate with the initiating user.

At task 606, telecommunications switch 101 either receives an indication that the target user will in fact communicate with the initiating user (or next intermediary user in the introduction chain) on behalf of the initiating user or does not receive the indication. This indication can be transmitted by either the intermediary user or the target user. When telecommunications switch 101 does receive the indication, control passes to task 607; otherwise, control passes to task 602 where telecommunications switch 101 generates another introduction chain to circumvent to obstacle.

At task 607, telecommunications switch 101 establishes a communication event between the initiating user and the target user, during which the initiating user communicates his or her ideas in well-known fashion.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   generating a first influence inference based on at least one communication event between a initiating user and a intermediary user;
   generating a second influence inference based on at least one communication event between the intermediary user and a target user; and
   generating an introduction chain from the initiating user to the target user via the intermediary user based on the first influence inference and the second influence inference.

2. The method of claim 1 further comprising:
   establishing a communication event between the initiating user and the intermediary user;
   receiving an indication that the intermediary user will communicate with the target user on behalf of the initiating user; and
   establishing a communication event between the intermediary user and the target user.

3. The method of claim 2 further comprising:
   receiving an indication that the target user will communicate with the initiating user; and
   establishing a communication event between the initiating user and the target user.

4. The method of claim 1 wherein the first influence inference is based, at least partially, on the frequency of communication events between the initiating user and the intermediary user.

5. The method of claim 1 wherein the first influence inference is based, at least partially, on the number of communication events between the initiating user and the intermediary user.

6. The method of claim 1 wherein the first influence inference is based, at least partially, on the direction of communication events between the initiating user and the intermediary user.

7. The method of claim 1 wherein the first influence inference is based, at least partially, on the latency of answering communication events between the initiating user and the intermediary user.

8. The method of claim 1 wherein the first influence inference is based, at least partially, on the latency of returning communication events between the initiating user and the intermediary user.

9. The method of claim 1 wherein the first influence inference is based, at least partially, on the calendrical time of communication events between the initiating user and the intermediary user.

10. A method comprising:
receiving an indication that an initiating user desires to communicate with a target user;
generating an introduction chain from the initiating user to the target user via a intermediary user based on (1) a first influence inference of communication events between the initiating user and the intermediary user, and (2) a second influence inference of communication events between the intermediary user and the target user; and
establishing a communication event between the initiating user and the intermediary user.

11. The method of claim 10 wherein the first influence inference is based, at least partially, on the frequency of communication events between the initiating user and the intermediary user.

12. The method of claim 10 wherein the first influence inference is based, at least partially, on the number of communication events between the initiating user and the intermediary user.

13. The method of claim 10 wherein the first influence inference is based, at least partially, on the direction of communication events between the initiating user and the intermediary user.

14. The method of claim 10 wherein the first influence inference is based, at least partially, on the latency of answering communication events between the initiating user and the intermediary user.

15. The method of claim 10 wherein the first influence inference is based, at least partially, on the latency of returning communication events between the initiating user and the intermediary user.

16. The method of claim 10 wherein the first influence inference is based, at least partially, on the calendrical time of communication events between the initiating user and the intermediary user.

17. A method comprising:
generating a first influence inference based on at least one communication event between an initiating user and a intermediary user based on the number of communication events between the initiating user and the intermediary user;
generating a second influence inference based on at least one communication event between the intermediary user and a target user based on the number of communication events between the intermediary user and the target user;
receiving an indication that an initiating user desires to communicate with the target user;
generating an introduction chain from the initiating user to the target user via a intermediary user based on (1) the first influence inference, and (2) the second influence inference.

18. The method of claim 17 wherein the first influence inference is based, at least partially, on the number of communication events between the initiating user and the intermediary user.

19. The method of claim 17 wherein the first influence inference is based, at least partially, on the direction of communication events between the initiating user and the intermediary user.

20. The method of claim 17 wherein the first influence inference is based, at least partially, on the latency of returning communication events between the initiating user and the intermediary user.

* * * * *